US010460745B2

(12) United States Patent
Zhou et al.

(10) Patent No.: US 10,460,745 B2
(45) Date of Patent: Oct. 29, 2019

(54) AUDIO CONTENT SEGMENTATION METHOD AND APPARATUS

(71) Applicant: Huawei Technologies Co., Ltd., Shenzhen, Guangdong (CN)

(72) Inventors: Wenyu Zhou, Shenzhen (CN); Zijun Li, Shenzhen (CN); Fen Yang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/543,952

(22) PCT Filed: Jan. 15, 2015

(86) PCT No.: PCT/CN2015/070798
§ 371 (c)(1),
(2) Date: Jul. 14, 2017

(87) PCT Pub. No.: WO2016/112519
PCT Pub. Date: Jul. 21, 2016

(65) Prior Publication Data
US 2018/0012615 A1 Jan. 11, 2018

(51) Int. Cl.
*G10L 21/028* (2013.01)
*G11B 27/031* (2006.01)
(Continued)

(52) U.S. Cl.
CPC .......... *G10L 21/028* (2013.01); *G06F 16/61* (2019.01); *G10L 25/51* (2013.01); *G11B 27/031* (2013.01); *G11B 27/28* (2013.01)

(58) Field of Classification Search
CPC .......... G11B 27/031; G10H 2210/125; G10H 2210/056; G10H 2210/105;
(Continued)

(56) References Cited

U.S. PATENT DOCUMENTS 7,319,185 B1 * 1/2008 Wieder ................ G10H 1/0041
84/609
2002/0078029 A1 * 6/2002 Pachet ................ G06F 17/30017
(Continued)

FOREIGN PATENT DOCUMENTS

CN 1779777 A 5/2006
CN 101217368 A 7/2008
(Continued)

*Primary Examiner* — Andrew C Flanders
(74) *Attorney, Agent, or Firm* — Kilpatrick Townsend & Stockton LLP

(57) ABSTRACT

Embodiments of the present invention provide an audio content segmentation method and an apparatus. The method includes: obtaining at least one piece of first segmentation location information of audio content; sending a segmentation location message to a server, wherein the segmentation location message carries the at least one piece of first segmentation location information of the audio content and an audio identifier of the audio content; receiving a segmentation location recommendation message sent by the server, wherein the segmentation location recommendation message carries the audio identifier of the audio content and the at least one piece of third segmentation location information; and segmenting the audio content according to the at least one piece of third segmentation location information.

19 Claims, 6 Drawing Sheets

(51) Int. Cl.
  *G11B 27/28* (2006.01)
  *G10L 25/51* (2013.01)
  *G06F 16/61* (2019.01)

(58) Field of Classification Search
  CPC ....... G10H 2240/131; G10H 2240/141; G10H 2240/016; G10H 2240/151; G10H 1/0025; G06F 17/30772; G06F 17/30017; H04N 21/4394
  See application file for complete search history.

(56) References Cited

U.S. PATENT DOCUMENTS

| | | | |
|---|---|---|---|
| 2003/0093790 A1 | 5/2003 | Logan et al. | |
| 2004/0117647 A1 | 6/2004 | Ballard | |
| 2005/0004690 A1* | 1/2005 | Zhang | G10L 25/48 700/94 |
| 2005/0044561 A1* | 2/2005 | McDonald | H04H 60/58 725/18 |
| 2009/0272253 A1* | 11/2009 | Yamashita | G10H 1/0025 84/611 |
| 2011/0000359 A1* | 1/2011 | Yoshida | G10H 1/0008 84/601 |
| 2011/0041059 A1* | 2/2011 | Amarasingham | G11B 27/034 715/716 |
| 2011/0112672 A1* | 5/2011 | Brown | G10H 1/0025 700/94 |
| 2012/0179786 A1 | 7/2012 | Nandagopal | |
| 2012/0232683 A1* | 9/2012 | Master | G06F 17/30743 700/94 |
| 2013/0287214 A1* | 10/2013 | Resch | G10H 1/0008 381/56 |
| 2014/0198252 A1 | 7/2014 | Pornprasitsakul et al. | |
| 2015/0068389 A1* | 3/2015 | Sugano | G10H 1/40 84/611 |
| 2015/0128788 A1* | 5/2015 | Brewer | G10H 1/0008 84/609 |

FOREIGN PATENT DOCUMENTS

| | | |
|---|---|---|
| CN | 101217638 A | 7/2008 |
| CN | 102170420 A | 8/2011 |

\* cited by examiner

AUDIO CONTENT SEGMENTATION METHOD AND APPARATUS

CROSS REFERENCE TO RELATED APPLICATION

The present application claims priority under 35 U.S.C. § 365 to International Patent Application No. PCT/CN2015/070798, filed on Jan. 15, 2015, which is incorporated herein by reference into the present disclosure as if fully set forth herein.

TECHNICAL FIELD

The present invention relates to the audio field, and in particular, to an audio content segmentation method and an apparatus.

BACKGROUND

Playing audio content (such as music or a voice) on an electronic device by using player software already becomes an extremely common manner. In a process of listening to played audio content, a user generally wants to capture some fragments that are in the audio content and that the user is relatively interested in, so as to facilitate later use. Therefore, how to capture some fragments from audio content already becomes a focus.

In the prior art, some fragments in audio content are captured generally according to a view (such as a waveform graph or a spectrum graph) related to the audio content. A specific process is: an electronic device obtains to-be-captured audio content selected by a user, and displays the obtained to-be-captured audio content on a display of the electronic device in a view form; in this case, the user selects a segmentation location in the displayed to-be-captured audio content, and user equipment obtains the segmentation location selected by the user, captures the to-be-captured audio content according to the obtained segmentation location, and finally stores a captured fragment, so as to complete capture of the to-be-captured audio content.

SUMMARY

Embodiments of the present invention provide an audio content segmentation method and an apparatus, so as to segment audio content by means of interaction between user equipment and a server.

To achieve the foregoing objective, the following technical solutions are adopted in the embodiments of the present invention:

According to a first aspect, an embodiment of the present invention provides an audio content segmentation method, including: receiving a segmentation location message sent by user equipment, where the segmentation location message carries at least one piece of first segmentation location information of audio content and an audio identifier of the audio content; searching, according to the audio identifier of the audio content, for stored at least one piece of second segmentation location information matching the audio identifier of the audio content; determining at least one piece of target segmentation location information from the at least one piece of first segmentation location information and determining at least one piece of reference segmentation location information from the at least one piece of second segmentation location information according to the at least one piece of first segmentation location information and the at least one piece of second segmentation location information; if a difference between each piece of target segmentation location information in the at least one piece of target segmentation location information and corresponding reference segmentation location information is less than a first preset value, determining at least one piece of third segmentation location information according to the at least one piece of target segmentation location information and the reference segmentation location information corresponding to each piece of target segmentation location information; and sending a segmentation location recommendation message to the user equipment, where the segmentation location recommendation message carries the audio identifier of the audio content and the at least one piece of third segmentation location information.

With reference to the first aspect, in a first possible implementation manner of the first aspect, the determining at least one piece of target segmentation location information from the at least one piece of first segmentation location information and determining at least one piece of reference segmentation location information from the at least one piece of second segmentation location information according to the at least one piece of first segmentation location information and the at least one piece of second segmentation location information includes: performing a first operation on the at least one piece of first segmentation location information and the at least one piece of second segmentation location information to obtain at least one operation result, determining, from the at least one operation result, at least one target operation result less than the first preset value, determining, as target segmentation location information, first segmentation location information corresponding to each target operation result in the at least one target operation result, and determining, as reference segmentation location information, second segmentation location information corresponding to each target operation result in the at least one target operation result.

With reference to the first aspect, in a second possible implementation manner of the first aspect, the method further includes: determining the at least one piece of target segmentation location information as the at least one piece of second segmentation location information if the difference between each piece of target segmentation location information in the at least one piece of target segmentation location information and corresponding reference segmentation location information is greater than or equal to the first preset value.

With reference to the first aspect, or the first or the second possible implementation manner of the first aspect, in a third possible implementation manner of the first aspect, the segmentation location recommendation message further carries weight information corresponding to the at least one piece of third segmentation location information, and the weight information is used to indicate a priority of the third segmentation location information.

With reference to the first aspect, or any one of the first to the third possible implementation manners of the first aspect, in a fourth possible implementation manner of the first aspect, the at least one piece of first segmentation location information includes a start location and an end location that are captured from the audio content, and the segmentation location message further carries a first pairing identifier matching the start location and the end location; and the at least one piece of third segmentation location information includes a target start location and a target end location that are of the audio content, and the segmentation location recommendation message further carries a second pairing identifier matching the target start location and the target end location.

With reference to the first aspect, or any one of the first to the fourth possible implementation manners of the first aspect, in a fifth possible implementation manner of the first aspect, the performing a first operation on the at least one piece of first segmentation location information and the at least one piece of second segmentation location information includes: taking an absolute value after subtracting the at least one piece of first segmentation location information from the at least one piece of second segmentation location information.

With reference to the first aspect, or any one of the first to the fifth possible implementation manners of the first aspect, in a sixth possible implementation manner of the first aspect, after the sending a segmentation location recommendation message to the user equipment, the method further includes: determining the at least one piece of third segmentation location information as the at least one piece of second segmentation location information.

According to a second aspect, an embodiment of the present invention provides an audio content segmentation method, including: obtaining at least one piece of first segmentation location information of audio content; sending a segmentation location message to a server, where the segmentation location message carries the at least one piece of first segmentation location information of the audio content and an audio identifier of the audio content; receiving a segmentation location recommendation message sent by the server, where the segmentation location recommendation message carries the audio identifier of the audio content and the at least one piece of third segmentation location information; and segmenting the audio content according to the at least one piece of third segmentation location information.

With reference to the second aspect, in a first possible implementation manner of the second aspect, the segmentation location recommendation message further carries weight information corresponding to each piece of third segmentation location information in the at least one piece of third segmentation location information, and the weight information is used to indicate a priority of each piece of third segmentation location information.

With reference to the second aspect, or the first possible implementation manner of the second aspect, in a second possible implementation manner of the second aspect, after the segmenting the audio content according to the at least one piece of third segmentation location information, the method further includes: sending, to the server, a recommendation success message carrying the segmentation location information, so that the server updates the weight information corresponding to the segmentation location information.

With reference to the second aspect, or the first or the second possible implementation manner of the second aspect, in a third possible implementation manner of the second aspect, the at least one piece of first segmentation location information includes a start location and an end location that are captured from the audio content, and the segmentation location message further carries a first pairing identifier matching the start location and the end location; and the at least one piece of third segmentation location information includes a target start location and a target end location that are of the audio content, and the segmentation location recommendation message further carries a second pairing identifier matching the target start location and the target end location.

With reference to the second aspect, or any one of the first to the third possible implementation manners of the second aspect, in a fourth possible implementation manner of the second aspect, the segmenting the audio content according to the at least one piece of third segmentation location information includes: obtaining a segmentation operation instruction, where the segmentation operation instruction includes segmentation location information selected from the at least one piece of third segmentation location information; obtaining a segmentation adjustment instruction, where the segmentation adjustment instruction is used to indicate an offset for adjustment to be performed on the segmentation location information; and segmenting the audio content according to the segmentation adjustment instruction and the segmentation operation instruction.

With reference to the second aspect, or any one of the first to the third possible implementation manners of the second aspect, in a fifth possible implementation manner of the second aspect, the segmenting the audio content according to the at least one piece of third segmentation location information includes: obtaining a segmentation operation instruction, where the segmentation operation instruction includes segmentation location information selected from the at least one piece of third segmentation location information; and segmenting the audio content according to the segmentation location information.

According to a third aspect, an embodiment of the present invention provides a server, including: a receiving unit, configured to receive a segmentation location message sent by user equipment, where the segmentation location message carries at least one piece of first segmentation location information of audio content and an audio identifier of the audio content; a processing unit, configured to search, according to the audio identifier that is of the audio content and that is received by the receiving unit, for stored at least one piece of second segmentation location information matching the audio identifier of the audio content, where the processing unit is further configured to: determine at least one piece of target segmentation location information from the at least one piece of first segmentation location information and determine at least one piece of reference segmentation location information from the at least one piece of second segmentation location information according to the at least one piece of first segmentation location information received by the receiving unit and the at least one piece of second segmentation location information, and the processing unit is further configured to: if a difference between each piece of target segmentation location information in the at least one piece of target segmentation location information and corresponding reference segmentation location information is less than a first preset value, determine at least one piece of third segmentation location information according to the at least one piece of target segmentation location information and the reference segmentation location information corresponding to each piece of target segmentation location information; and a sending unit, configured to send a segmentation location recommendation message to the user equipment, where the segmentation location recommendation message carries the audio identifier of the audio content and the at least one piece of third segmentation location information determined by the processing unit.

With reference to the third aspect, in a first possible implementation manner of the third aspect, the processing unit is specifically configured to: perform a first operation on the at least one piece of first segmentation location information received by the receiving unit and the at least one piece of second segmentation location information to obtain at least one operation result, determine, from the at least one operation result, at least one target operation result less than the first preset value, determine, as target segmentation location information, first segmentation location information corresponding to each target operation result in the at least one target operation result, and determine, as reference segmentation location information, second segmentation location information corresponding to each target operation result in the at least one target operation result.

With reference to the third aspect, in a second possible implementation manner of the third aspect, the processing unit is further configured to determine the at least one piece of target segmentation location information as the at least one piece of second segmentation location information when the difference between each piece of target segmentation location information in the at least one piece of target segmentation location information and corresponding reference segmentation location information is greater than or equal to the first preset value.

With reference to the third aspect, or the first or the second possible implementation manner of the third aspect, in a third possible implementation manner of the third aspect, the segmentation location recommendation message further carries weight information corresponding to the at least one piece of third segmentation location information, and the weight information is used to indicate a priority of the third segmentation location information.

With reference to the third aspect, or any one of the first to the third possible implementation manners of the third aspect, in a fourth possible implementation manner of the third aspect, the at least one piece of first segmentation location information includes a start location and an end location that are captured from the audio content, and the segmentation location message further carries a first pairing identifier matching the start location and the end location; and the at least one piece of third segmentation location information includes a target start location and a target end location that are of the audio content, and the segmentation location recommendation message further carries a second pairing identifier matching the target start location and the target end location.

With reference to the third aspect, or any one of the first to the fourth possible implementation manners of the third aspect, in a fifth possible implementation manner of the third aspect, the processing unit is specifically configured to determine, as the at least one piece of third segmentation location information, a result obtained after each piece of target segmentation location information in the at least one piece of target segmentation location information is separately added to the reference segmentation location information corresponding to each piece of target segmentation location information and an average is taken.

With reference to the third aspect, or any one of the first to the fifth possible implementation manners of the third aspect, in a sixth possible implementation manner of the third aspect, the processing unit is further configured to determine the at least one piece of third segmentation location information as the at least one piece of second segmentation location information.

According to a fourth aspect, an embodiment of the present invention provides user equipment, including: a processing unit, configured to obtain at least one piece of first segmentation location information of audio content; a sending unit, configured to send a segmentation location message to a server, where the segmentation location message carries the at least one piece of first segmentation location information of the audio content and an audio identifier of the audio content; and a receiving unit, configured to receive a segmentation location recommendation message sent by the server, where the segmentation location recommendation message carries the audio identifier of the audio content and the at least one piece of third segmentation location information, and the processing unit is further configured to segment the audio content according to the at least one piece of third segmentation location information received by the receiving unit.

With reference to the fourth aspect, in a first possible implementation manner of the fourth aspect, the segmentation location recommendation message further carries weight information corresponding to the at least one piece of third segmentation location information, and the weight information is used to indicate a priority of the third segmentation location information.

With reference to the fourth aspect, or the first possible implementation manner of the fourth aspect, in a second possible implementation manner of the fourth aspect, the sending unit is further configured to send, to the server, a recommendation success message carrying the segmentation location information, so that the server updates the weight information corresponding to the segmentation location information.

With reference to the fourth aspect, or the first or the second possible implementation manner of the fourth aspect, in a third possible implementation manner of the fourth aspect, the at least one piece of first segmentation location information includes a start location and an end location that are captured from the audio content, and the segmentation location message further carries a first pairing identifier matching the start location and the end location; and the at least one piece of third segmentation location information includes a target start location and a target end location that are of the audio content, and the segmentation location recommendation message further carries a second pairing identifier matching the target start location and the target end location.

With reference to the fourth aspect, or any one of the first to the third possible implementation manners of the fourth aspect, in a fourth possible implementation manner of the fourth aspect, the processing unit is specifically configured to: obtain a segmentation operation instruction, where the segmentation operation instruction includes segmentation location information selected from the at least one piece of third segmentation location information; obtain a segmentation adjustment instruction, where the segmentation adjustment instruction is used to indicate an offset for adjustment to be performed on the segmentation location information; and segment the audio content according to the segmentation adjustment instruction and the segmentation operation instruction.

With reference to the fourth aspect, or any one of the first to the fourth possible implementation manners of the fourth aspect, in a fifth possible implementation manner of the fourth aspect, the processing unit is specifically configured to: obtain a segmentation operation instruction, where the segmentation operation instruction includes segmentation location information selected from the at least one piece of third segmentation location information; and segment the audio content according to the segmentation location information.

According to a fifth aspect, an embodiment of the present invention provides a server, including: a receiver, a processor, and a transmitter, where the receiver is connected to the processor, and the processor is further connected to the transmitter; the receiver is configured to receive a segmentation location message sent by user equipment, where the segmentation location message carries at least one piece of first segmentation location information of audio content and an audio identifier of the audio content; the processor is configured to search, according to the audio identifier that is of the audio content and that is received by the receiver, for stored at least one piece of second segmentation location information matching the audio identifier of the audio content; the processor is further configured to: determine at least one piece of target segmentation location information from the at least one piece of first segmentation location information and determine at least one piece of reference segmentation location information from the at least one piece of second segmentation location information according to the at least one piece of first segmentation location information received by the receiver and the at least one piece of second segmentation location information; the processor is further configured to: if a difference between each piece of target segmentation location information in the at least one piece of target segmentation location information and corresponding reference segmentation location information is less than a first preset value, determine at least one piece of third segmentation location information according to the at least one piece of target segmentation location information and the reference segmentation location information corresponding to each piece of target segmentation location information; and the transmitter is configured to send a segmentation location recommendation message to the user equipment, where the segmentation location recommendation message carries the audio identifier of the audio content and the at least one piece of third segmentation location information determined by the processor.

With reference to the fifth aspect, in a first possible implementation manner of the fifth aspect, the processor is specifically configured to: perform a first operation on the at least one piece of first segmentation location information received by the receiver and the at least one piece of second segmentation location information to obtain at least one operation result, determine, from the at least one operation result, at least one target operation result less than the first preset value, determine, as target segmentation location information, first segmentation location information corresponding to each target operation result in the at least one target operation result, and determine, as reference segmentation location information, second segmentation location information corresponding to each target operation result in the at least one target operation result.

With reference to the fifth aspect, in a second possible implementation manner of the fifth aspect, the processor is further configured to determine the at least one piece of target segmentation location information as the at least one piece of second segmentation location information when the difference between each piece of target segmentation location information in the at least one piece of target segmentation location information and corresponding reference segmentation location information is greater than or equal to the first preset value.

With reference to the fifth aspect, or the first or the second possible implementation manner of the fifth aspect, in a third possible implementation manner of the fifth aspect, the segmentation location recommendation message further carries weight information corresponding to the at least one piece of third segmentation location information, and the weight information is used to indicate a priority of the third segmentation location information.

With reference to the fifth aspect, or any one of the first to the third possible implementation manners of the fifth aspect, in a fourth possible implementation manner of the fifth aspect, the at least one piece of first segmentation location information includes a start location and an end location that are captured from the audio content, and the segmentation location message further carries a first pairing identifier matching the start location and the end location; and the at least one piece of third segmentation location information includes a target start location and a target end location that are of the audio content, and the segmentation location recommendation message further carries a second pairing identifier matching the target start location and the target end location.

With reference to the fifth aspect, or any one of the first to the fourth possible implementation manners of the fifth aspect, in a fifth possible implementation manner of the fifth aspect, the processor is specifically configured to determine, as the at least one piece of third segmentation location information, a result obtained after each piece of target segmentation location information in the at least one piece of target segmentation location information is separately added to the reference segmentation location information corresponding to each piece of target segmentation location information and an average is taken.

With reference to the fifth aspect, or any one of the first to the fifth possible implementation manners of the fifth aspect, in a sixth possible implementation manner of the fifth aspect, the processor is further configured to determine the at least one piece of third segmentation location information as the at least one piece of second segmentation location information.

According to a sixth aspect, an embodiment of the present invention provides user equipment, including: a processor, a transmitter, and a receiver, where the processor is connected to the transmitter, and the transmitter is further connected to the receiver; the processor is configured to obtain at least one piece of first segmentation location information of audio content; the transmitter is configured to send a segmentation location message to a server, where the segmentation location message carries the at least one piece of first segmentation location information of the audio content and an audio identifier of the audio content; the receiver is configured to receive a segmentation location recommendation message sent by the server, where the segmentation location recommendation message carries the audio identifier of the audio content and the at least one piece of third segmentation location information; and the processor is further configured to segment the audio content according to the at least one piece of third segmentation location information received by the receiver.

With reference to the sixth aspect, in a first possible implementation manner of the sixth aspect, the segmentation location recommendation message further carries weight information corresponding to the at least one piece of third segmentation location information, and the weight information is used to indicate a priority of the third segmentation location information.

With reference to the sixth aspect, or the first possible implementation manner of the sixth aspect, in a second possible implementation manner of the sixth aspect, the at least one piece of first segmentation location information includes a start location and an end location that are captured from the audio content, and the segmentation location message further carries a first pairing identifier matching the start location and the end location; and the at least one piece of third segmentation location information includes a target start location and a target end location that are of the audio content, and the segmentation location recommendation message further carries a second pairing identifier matching the target start location and the target end location.

With reference to the sixth aspect, or the first or the second possible implementation manner of the sixth aspect, in a third possible implementation manner of the sixth aspect, the processor is specifically configured to: obtain a segmentation operation instruction, where the segmentation operation instruction includes segmentation location information selected from the at least one piece of third segmentation location information; obtain a segmentation adjustment instruction, where the segmentation adjustment instruction is used to indicate an offset for adjustment to be performed on the segmentation location information; and segment the audio content according to the segmentation adjustment instruction and the segmentation operation instruction.

With reference to the sixth aspect, or any one of the first to the third possible implementation manners of the sixth aspect, in a fourth possible implementation manner of the sixth aspect, the processor is specifically configured to: obtain a segmentation operation instruction, where the segmentation operation instruction includes segmentation location information selected from the at least one piece of third segmentation location information; and segment the audio content according to the segmentation location information.

According to a seventh aspect, an embodiment of the present invention provides a computer readable storage medium storing one or more programs, where the one or more programs include an instruction, and when executed by a server including multiple application programs, the instruction causes the server to execute the method described in the foregoing embodiment.

According to an eighth aspect, an embodiment of the present invention provides a computer readable storage medium storing one or more programs, where the one or more programs include an instruction, and when executed by user equipment including multiple application programs, the instruction causes the user equipment to execute the method described in the foregoing embodiment.

The embodiments of the present invention provide the audio content segmentation method and the apparatus, where a server determines at least one piece of third segmentation location information according to at least one piece of target segmentation location information and at least one piece of reference segmentation location information, and finally sends a recommended segmentation location to user equipment, so that the user equipment segments audio content according to the at least one piece of third segmentation location information. It can be learned that audio content segmentation is implemented by means of interaction between the user equipment and the server in the present invention. Further, because third segmentation location information used when the user equipment segments the audio content is a segmentation location obtained by means of an operation according to target segmentation location information and reference segmentation location information, and a difference between the target segmentation location information and the reference segmentation location information is less than a first preset value, which means that the target segmentation location information is relatively close to the reference segmentation location information, an error of the third segmentation location information obtained by means of the operation according to the target segmentation location information and the reference segmentation location information is small compared with that of first segmentation location information, thereby reducing an error of captured audio content.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
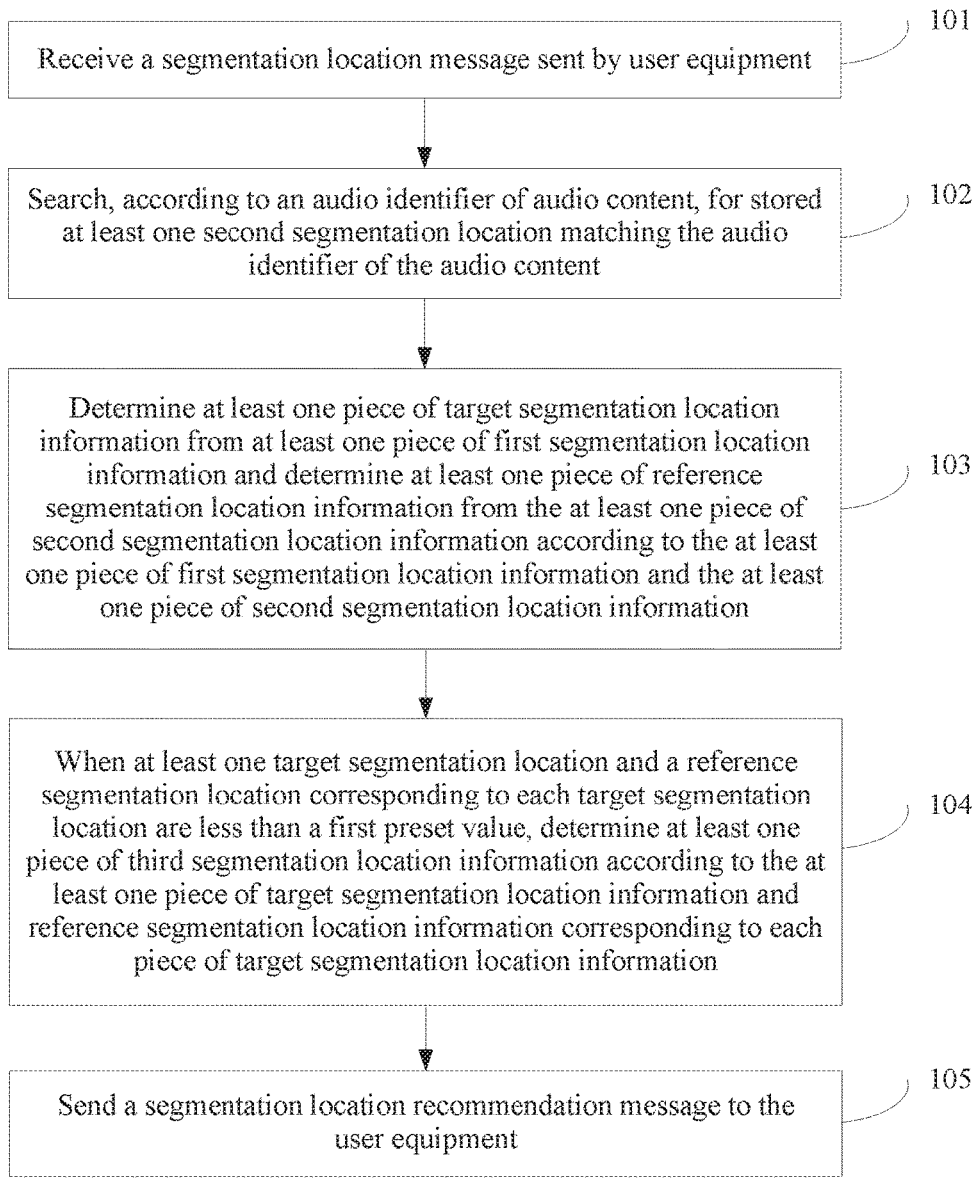
FIG. 1 is a schematic flowchart of an audio content segmentation method according to an embodiment of the present invention.

An embodiment of the present invention provides an audio content segmentation method. As shown in FIG. 1, the method includes the following steps.

101. Receive a segmentation location message sent by user equipment.

The segmentation location message carries at least one piece of first segmentation location information of audio content and an audio identifier of the audio content. First segmentation location information is used to indicate one piece of time information selected by a user from the audio content.

Specifically, a server establishes a connection to the user equipment in a wired or wireless manner, so that the server may receive the segmentation location message that carries the at least one piece of first segmentation location information of the audio content and the audio identifier of the audio content and that is sent by the user equipment in the wired or wireless manner, and when receiving the segmentation location message, may learn that time information related to the first segmentation location information needs to be recommended to the user equipment.

102. Search, according to an audio identifier of the audio content, for stored at least one piece of second segmentation location information matching the audio identifier of the audio content.

The at least one piece of second segmentation location information is a segmentation location sent by at least one piece of user equipment. Second segmentation location information is used to indicate one piece of stored time information matching the audio identifier.

Specifically, after receiving the segmentation location message that carries the at least one piece of first segmentation location information of the audio content and the audio identifier of the audio content and that is sent by the user equipment, the server parses the segmentation location message to obtain the audio identifier of the audio content and the at least one piece of first segmentation location information of the audio content, and searches, according to the audio identifier of the audio content, a previously stored list of a correspondence between second segmentation location information and an audio identifier for the at least one piece of second segmentation location information matching the audio identifier of the audio content.

Exemplarily, as shown in Table 1, Table 1 is a list of a correspondence between an audio identifier and second segmentation location information according to an embodiment of the present invention. It can be seen that two pieces of audio content are stored in Table 1, and audio identifiers of the two pieces of audio content are respectively M0001 and M0002; there are three pieces of second segmentation location information corresponding to audio content with the audio identifier M0001, which are respectively 1:13, 1:15, and 1:20; there are three pieces of second segmentation location information corresponding to audio content with the audio identifier M0002, which are respectively 2:13, 2:15, and 2:20. It is assumed that an audio identifier that is of audio content and that is obtained by the server is M0001; in this case, Table 1 is searched according to the audio identifier M0001 for second segmentation location information matching M0001, and there are three pieces of second segmentation location information obtained by searching, which are respectively 1:13, 1:15, and 1:20.

TABLE 1

| Audio identifier | Second segmentation location information (minute:second) |
| --- | --- |
| M0001 | 1:13 |
| M0001 | 1:15 |
| M0001 | 1:20 |
| M0002 | 2:13 |
| M0002 | 2:15 |
| M0002 | 2:20 |

It should be noted that second segmentation location information stored in the server may be sent by one piece of user equipment, or may be sent by multiple pieces of user equipment. When receiving second segmentation location information sent by any user equipment, the server stores the second segmentation location information and a corresponding audio identifier.

103. Determine at least one piece of target segmentation location information from the at least one piece of first segmentation location information and determine at least one piece of reference segmentation location information from the at least one piece of second segmentation location information according to the at least one piece of first segmentation location information and the at least one piece of second segmentation location information.

A first preset value is a value that is pre-stored by the server and that is used to measure whether each piece of target segmentation location information is relatively close to corresponding reference segmentation location information. If a difference between target segmentation location information and corresponding reference segmentation location information is less than the first preset value, it is considered that the target segmentation location information is relatively close to the corresponding reference segmentation location information. If a difference between target segmentation location information and corresponding reference segmentation location information is greater than or equal to the first preset value, it is considered that the target segmentation location information is not close to the corresponding reference segmentation location information.

Optionally, the server performs a first operation on the at least one piece of first segmentation location information and the at least one piece of second segmentation location information to obtain at least one operation result, determines, from the at least one operation result, at least one target operation result less than the first preset value, determines, as target segmentation location information, first segmentation location information corresponding to each target operation result in the at least one target operation result, and determines, as reference segmentation location information, second segmentation location information corresponding to each target operation result in the at least one target operation result.

In addition, the server determines, from the at least one operation result, at least one target operation result greater than or equal to the first preset value, determines, as target segmentation location information, first segmentation location information corresponding to each target operation result in the at least one target operation result greater than or equal to the first preset value, and determines, as reference segmentation location information, second segmentation location information corresponding to each target operation result in the at least one target operation result greater than or equal to the first preset value.

It should be noted that, that a first operation is performed on the at least one piece of first segmentation location information and the at least one piece of second segmentation location information may be that a first operation is performed on each piece of first segmentation location information in the at least one piece of first segmentation location information and each piece of second segmentation location information in the at least one piece of second segmentation location information, or may be that several pieces of first segmentation location information are randomly selected from the at least one piece of first segmentation location information, several pieces of second segmentation location information are randomly selected from the at least one piece of second segmentation location information, and then a first operation is separately performed on the several pieces of first segmentation location information randomly selected from the at least one piece of first segmentation location information and the several pieces of second segmentation location information randomly selected from the at least one piece of second segmentation location information. The present invention sets no limitation thereto.

It should be noted that the first operation may be taking an absolute value after subtraction, or may be another operation that may reflect that the first segmentation location information is relatively close to the second segmentation location information. For example, after each segmentation location in the at least one piece of first segmentation location information is separately divided by each piece of second segmentation location information in the at least one piece of second segmentation location information, comparison is performed between a quotient and 1. The present invention sets no limitation thereto.

104. If a difference between each piece of target segmentation location information in the at least one piece of target segmentation location information and corresponding reference segmentation location information is greater than or equal to the first preset value, determine at least one piece of third segmentation location information according to the at least one piece of target segmentation location information and the reference segmentation location information corresponding to each piece of target segmentation location information.

Optionally, the server determines, as the at least one piece of third segmentation location information, a result obtained after each piece of target segmentation location information in the at least one piece of target segmentation location information is separately added to the reference segmentation location information corresponding to each piece of target segmentation location information and an average is taken.

105. Send a segmentation location recommendation message to the user equipment.

The segmentation location recommendation message carries the audio identifier of the audio content and the at least one piece of third segmentation location information.

Specifically, when obtaining the at least one piece of third segmentation location information, the server sends, to the user equipment, the segmentation location recommendation message carrying the at least one piece of third segmentation location information and the audio identifier of the audio content, so that when receiving the segmentation location recommendation message sent by the server, the user equipment segments the audio content according to the at least one piece of third segmentation location information carried in the segmentation location recommendation message.

It should be noted that the user equipment in this embodiment of the present invention may be a mobile device such as a mobile phone or a tablet, or may be a device such as a computer. The present invention sets no limitation thereto.

Exemplarily, when the at least one piece of first segmentation location information includes at least two pieces of first segmentation location information, and the at least one piece of second segmentation location information includes at least two pieces of second segmentation location information, it is assumed that the at least one piece of first segmentation location information obtained by the server is 1:10 and 1:14, at least one piece of second segmentation location information obtained by searching is respectively 1:13, 1:15, and 1:20, an adopted first operation is taking an absolute value after subtraction, and the first preset value is 4 seconds; in this case, obtained operation results are: |1:10−1:13|=3 seconds, |1:10−1:15|=5 seconds, |1:10−1:20|=10 seconds, |1:14−1:13|=1 second, |1:14−1:15|=1 second, |1:14−1:20|=6 seconds, that is, there are six obtained operation results, and then an operation result less than the first preset value 4 seconds is determined from the six obtained operation results, that is, 1 second and 3 seconds. That is, obtained target operation results are 1 second and 3 seconds. First segmentation location information 1:14 participating in a calculation of 1 second is determined as target segmentation location information, and second segmentation location information 1:13 and 1:15 participating in a calculation of 1 second is determined as reference segmentation location information. First segmentation location information 1:10 participating in a calculation of 3 seconds is determined as target segmentation location information, and second segmentation location information 1:13 participating in a calculation of 3 seconds is determined as reference segmentation location information. In this case, a summation is performed and an average is taken separately on 1:14 and 1:13, 1:14 and 1:15, and 1:10 and 1:13, that is, (1:14+1:13)/2=1:13.5, (1:14+1:15)/2=1:14.5, and (1:10+1:13)/2=1:11.5. That is, there are three pieces of obtained third segmentation location information, which are respectively 1:13.5, 1:14.5, and 1:11.5. Finally, the server separately adds 1:13.5, 1:14.5, and 1:11.5 into the segmentation location recommendation message and sends the segmentation location recommendation message to the user equipment.

When the at least one piece of first segmentation location information includes one piece of first segmentation location information, and the at least one piece of second segmentation location information includes one piece of second segmentation location information, it is assumed that the at least one piece of first segmentation location information obtained by the server is 1:10, at least one piece of second segmentation location information obtained by searching is 1:13, an adopted first operation is taking an absolute value after subtraction, and the first preset value is seconds; in this case, an obtained operation result is: |1:10−1:13|=3 seconds. Comparison is further performed between 3 seconds and the first preset value 4 seconds, and it can be learned that 3 seconds is less than 4 seconds. Therefore, first segmentation location information 1:10 participating in a calculation of 3 seconds is determined as target segmentation location information, second segmentation location information 1:13 participating in a calculation of 3 seconds is determined as reference segmentation location information, and then a summation is performed and an average is taken on 1:10 and 1:13, that is, (1:10+1:13)/2=1:11.5. That is, there is also one obtained third segmentation location, which is 1:11.5. Finally, the server adds 1:11.5 into the segmentation location recommendation message and sends the segmentation location recommendation message to the user equipment.

This embodiment of the present invention provides the audio content segmentation method. A server determines at least one piece of third segmentation location information according to at least one piece of target segmentation location information and at least one piece of reference segmentation location information, and sends a recommended segmentation location to user equipment, so that the user equipment segments audio content according to the at least one piece of third segmentation location information. It can be learned that audio content segmentation is implemented by means of interaction between the user equipment and the server in the present invention. Further, because a difference between target segmentation location information and reference segmentation location information is less than a first preset value, that is, they are relatively close, an error of third segmentation location information obtained by means of an operation according to the target segmentation location information and the reference segmentation location information is small compared with that of first segmentation location information, thereby reducing an error of captured audio content.

Figure 2:
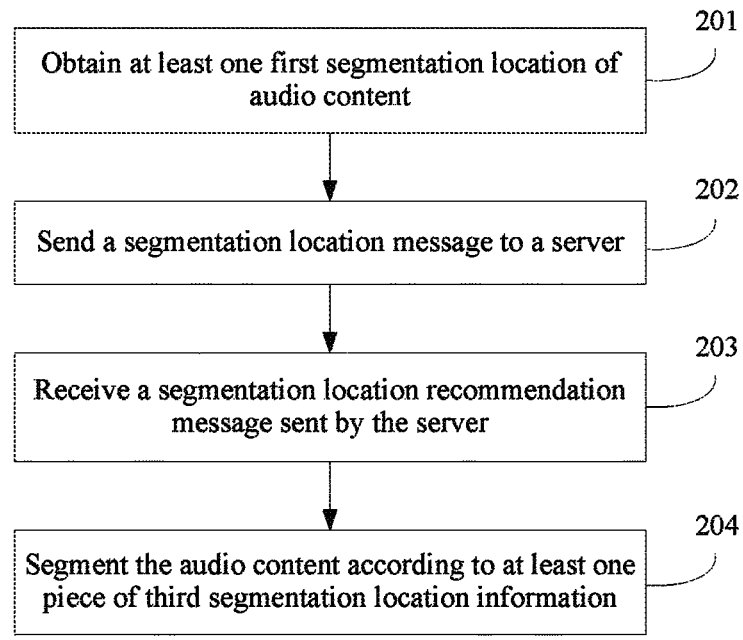
FIG. 2 is a schematic flowchart of another audio content segmentation method according to an embodiment of the present invention.

An embodiment of the present invention provides an audio content segmentation method. As shown in FIG. 2, the method includes the following steps.

201. Obtain at least one piece of first segmentation location information of audio content.

First segmentation location information is used to indicate one piece of time information selected by a user from the audio content.

Specifically, the user may segment the audio content on user equipment according to his or her requirement, that is, the user enters the at least one piece of first segmentation location information of the audio content on the user equipment. In this case, the user equipment obtains the at least one piece of first segmentation location information of the audio content.

It should be noted that the at least one piece of first segmentation location information may be one start location or multiple start locations, or may be one end location or multiple end locations, or may be one start location and one end location, or multiple start locations and an end location corresponding to each start location. The present invention sets no limitation thereto.

202. Send a segmentation location message to a server.

The segmentation location message carries the at least one piece of first segmentation location information of the audio content and an audio identifier of the audio content.

Specifically, after obtaining the at least one piece of first segmentation location information of the audio content, the user equipment sends, to the server, the segmentation location message carrying the audio identifier of the audio content and the at least one piece of first segmentation location information of the audio content.

203. Receive a segmentation location recommendation message sent by the server.

The segmentation location recommendation message carries the audio identifier of the audio content and the at least one piece of third segmentation location information.

204. Segment the audio content according to the at least one piece of third segmentation location information.

Specifically, when receiving the segmentation location recommendation message that carries the audio identifier of the audio content and the at least one piece of third segmentation location information and that is sent by the server, the user equipment parses the segmentation location recommendation message to obtain the audio identifier of the audio content and the corresponding at least one piece of third segmentation location information, determines whether the obtained audio identifier of the audio content is an audio identifier of audio content that corresponds to the at least one piece of first segmentation location information and that is sent by the user equipment, and if it is determined that the obtained audio identifier of the audio content is the audio identifier of the audio content that corresponds to the at least one piece of first segmentation location information and that is sent by the user equipment, displays the received at least one piece of third segmentation location information by using a display, so that the user selects appropriate segmentation location information from the at least one piece of third segmentation location information. In this case, the user equipment may obtain the segmentation location information selected by the user from the at least one piece of third segmentation location information, and segment the audio content according to the segmentation location information selected from the at least one piece of third segmentation location information.

Figure 3:
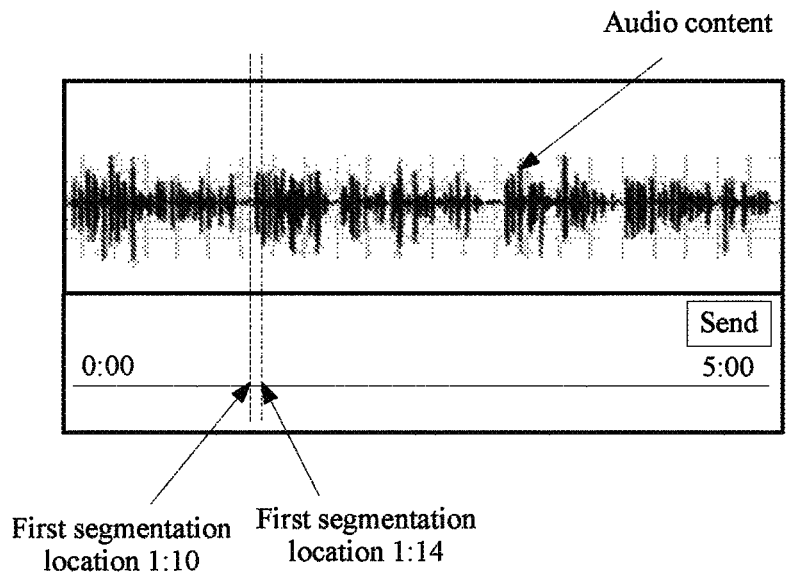
FIG. 3 is an exemplary interface diagram in which user equipment obtains a first segmentation location according to an embodiment of the present invention.

Exemplarily, when the at least one piece of first segmentation location information includes at least two pieces of first segmentation location information, as shown in FIG. 3, a spectrum graph of the audio content is displayed on the user equipment. It is assumed that the user selects two pieces of first segmentation location information on the spectrum graph of the audio content according to his or her requirement, which are respectively 1:10 and 1:14, and clicks a send button. In this case, the user equipment may obtain the two pieces of segmentation location information 1:10 and 1:14, add 1:10, 1:14, and the audio identifier M0001 of the audio content into the segmentation location message and send the segmentation location message to the server, and then receive a segmentation location recommendation message that carries 1:13.5, 1:14.5, and 1:11.5 and that is sent by the server. In this case, the user equipment displays, by using the display, third segmentation location information for the user to select, which is 1:13.5, 1:14.5, and 1:11.5. The user may select segmentation location information according to his or her requirement. It is assumed that the segmentation location information selected by the user is 1:13.5; in this case, segmentation location information obtained by the user equipment is 1:13.5, and the audio content is segmented according to 1:13.5.

When the at least one piece of first segmentation location information includes one piece of first segmentation location information, it is assumed that first segmentation location information selected by the user is 1:10, and the send button is clicked. In this case, the user equipment may obtain the segmentation location information 1:10, and add 1:10 and the audio identifier M0001 of the audio content into the segmentation location message and send the segmentation location message to the server. It is assumed that there is also only one piece of second segmentation location information obtained by searching according to the audio identifier M0001, that is, 1:13; in this case, the segmentation location recommendation message sent by the server and received by the user equipment also carries only a third segmentation location 1:11.5. In this case, the user equipment displays the third segmentation location information 1:11.5 by using the display, the user selects the third segmentation location information 1:11.5, and the user equipment segments the audio content according to 1:11.5.

It should be noted that a type of the at least one piece of third segmentation location information obtained by the user equipment is the same as that of the at least one piece of first segmentation location information. For example, when the at least one piece of first segmentation location information is a start location, the at least one piece of third segmentation location information is at least one start location. When the at least one piece of first segmentation location information is an end location, the at least one piece of third segmentation location information is at least one end location. When the at least one piece of first segmentation location information includes a start location and an end location, the at least one piece of third segmentation location information is at least one start location and an end location corresponding to each start location.

It should be noted that when the at least one piece of third segmentation location information obtained by the user equipment is at least one start location, the user needs to select an end location of the audio content according to his or her requirement, so that the user equipment may capture the audio content according to the end location selected by the user according to his or her requirement and a start location selected by the user from the at least one piece of third segmentation location information. When the at least one piece of third segmentation location information obtained by the user equipment is at least one end location, the user needs to select a start location of the audio content according to his or her requirement, so that the user equipment may capture the audio content according to the start location selected by the user according to his or her requirement and an end location selected by the user from the at least one piece of third segmentation location information. When the at least one piece of third segmentation location information obtained by the user equipment is at least one start location and at least one end location, the user equipment may capture the audio content according to a start location and an end location that are selected by the user from the at least one piece of third segmentation location information.

This embodiment of the present invention provides the audio content segmentation method. User equipment sends a segmentation location message to a server, so that the server determines at least one piece of third segmentation location information according to at least one piece of target segmentation location information and at least one piece of reference segmentation location information and sends a recommended segmentation location to the user equipment, and the user equipment segments audio content according to the at least one piece of third segmentation location information. It can be learned that audio content segmentation is implemented by means of interaction between the user equipment and the server in the present invention. Further, because a difference between target segmentation location information and reference segmentation location information is less than a first preset value, that is, they are relatively close, an error of third segmentation location information obtained by means of an operation according to the target segmentation location information and the reference segmentation location information is small compared with that of first segmentation location information, thereby reducing an error of captured audio content.

Figure 4A:
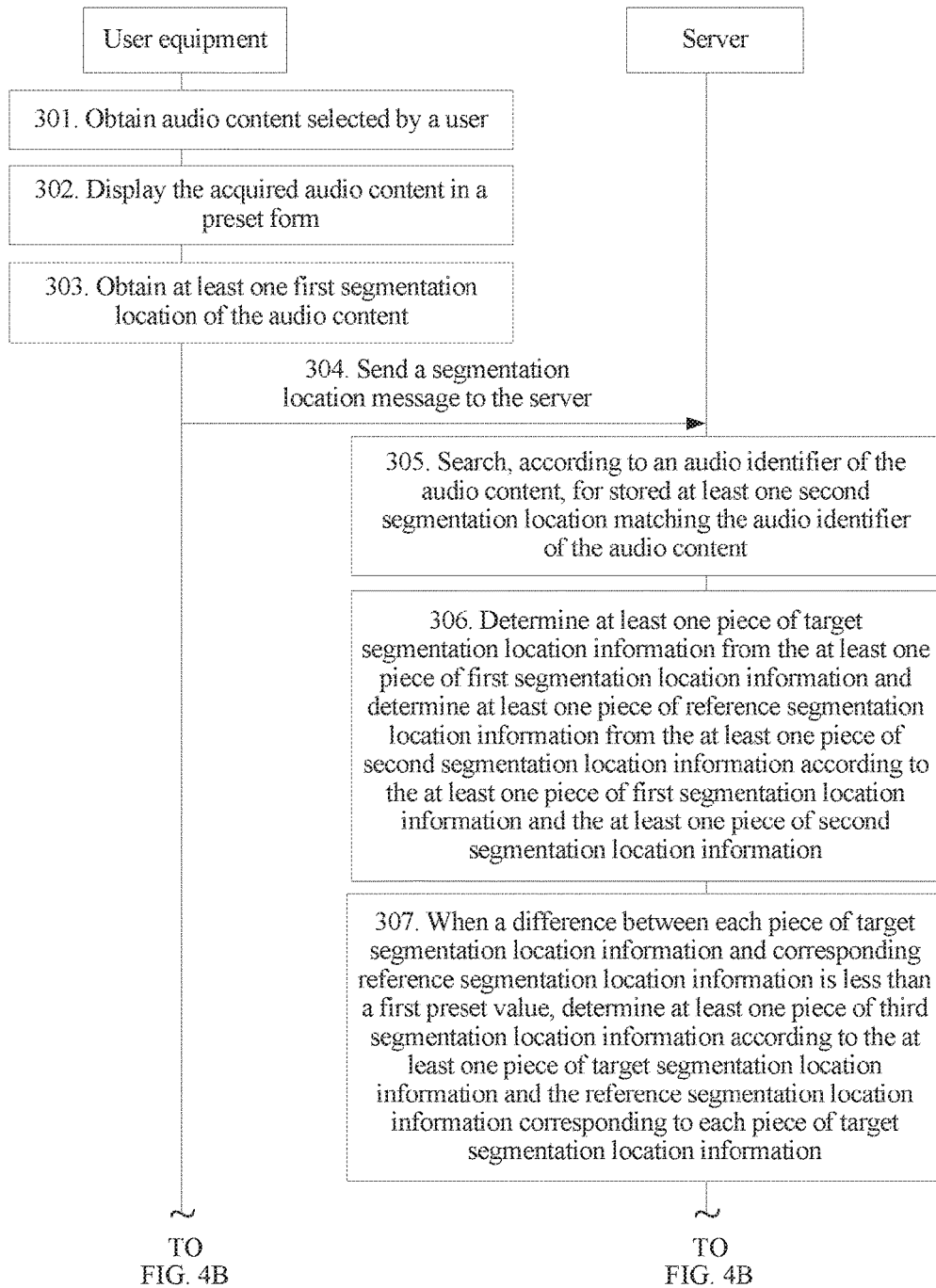
FIG. 4A and FIG. 4B are a schematic flowchart of another audio content segmentation method according to an embodiment of the present invention.
Figure 4B:
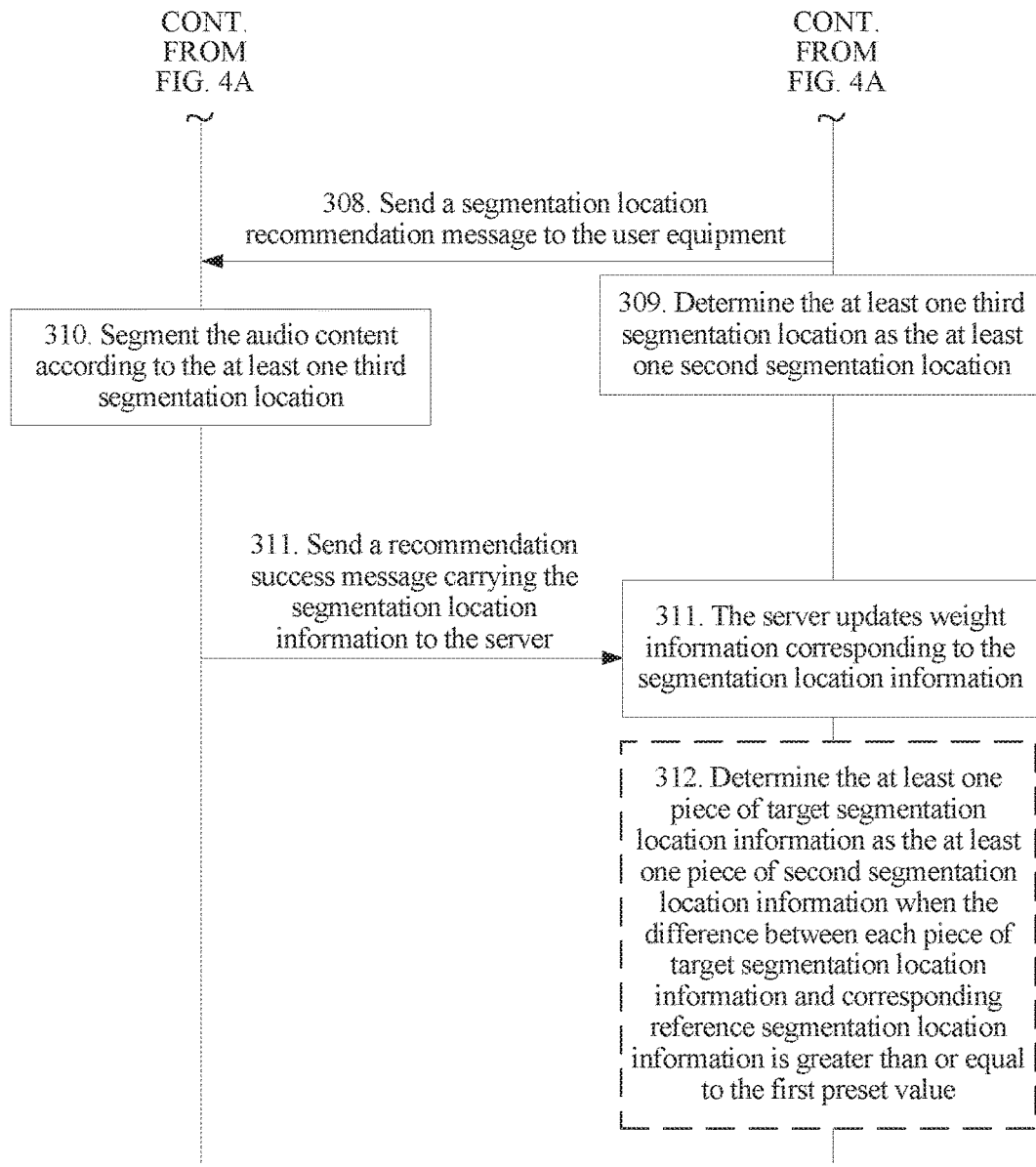

An embodiment of the present invention provides an audio content segmentation method. As shown in FIG. 4A and FIG. 4B, the method includes the following steps.

301. User equipment obtains audio content selected by a user.

302. The user equipment displays the obtained audio content in a preset form.

The preset form includes a waveform form, and/or a spectrum form, and/or a text form.

It should be noted that the user equipment further displays, when displaying the obtained audio content, a timeline determined according to content of the audio content.

303. The user equipment obtains at least one piece of first segmentation location information of the audio content.

For details, reference may be made to step 201. The details are not described herein in the present invention.

The at least one piece of first segmentation location information includes a start location and an end location that are captured from the audio content.

In addition, if the at least one piece of first segmentation location information includes the start location and the end location that are captured from the audio content, a segmentation location message further carries a first pairing identifier matching the start location and the end location, so that when receiving the segmentation location message, a server may correspondingly store the start location and the end location that are of the audio content according to the first pairing identifier.

The first pairing identifier is used to indicate a correspondence between the start location and the end location that are captured from the audio content.

Exemplarily, it is assumed that there are two start locations captured from the audio content, which are respectively 1:11 and 1:15, there are two end locations, which are respectively 2:01 and 2:05, the start location 1:11 corresponds to the end location 2:01, and the start location 1:15 corresponds to the end location 2:05. To ensure correct correspondences between the start locations and the end locations, pairing identifiers need to be added, that is, first pairing identifiers. For example, a first pairing identifier added to the start location 1:11 and the end location 2:01 is 01, and a first pairing identifier added to the start location 1:15 and the end location 2:05 is 02.

It should be noted that when selecting the at least one piece of first segmentation location information of the audio content, the user may perform selection only according to a waveform of the audio content, or may perform selection only according to a spectrum of the audio content, or may perform selection only according to a text of the audio content, or may perform selection according to any combination manner of a waveform, a spectrum, and a text that are of the audio content. The present invention sets no limitation thereto.

304. The user equipment sends a segmentation location message to a server. The server receives the segmentation location message sent by the user equipment.

The segmentation location message carries the at least one piece of first segmentation location information of the audio content and an audio identifier of the audio content.

For details, reference may be made to step 202 and step 101. The details are not described herein in the present invention.

Further, after receiving the segmentation location message sent by the user equipment, the server correspondingly stores the at least one piece of first segmentation location information and the audio identifier of the audio content that are carried in the segmentation location message.

305. The server searches, according to an audio identifier of the audio content, for stored at least one piece of second segmentation location information matching the audio identifier of the audio content.

The at least one piece of second segmentation location information is a segmentation location sent by at least one piece of user equipment.

For details, reference may be made to step 102. The details are not described herein in the present invention.

It should be noted that when storing each piece of second segmentation location information in the at least one piece of second segmentation location information, the server may further store corresponding weight information that is set for each piece of second segmentation location information.

306. The server determines at least one piece of target segmentation location information from the at least one piece of first segmentation location information and determines at least one piece of reference segmentation location information from the at least one piece of second segmentation location information according to the at least one piece of first segmentation location information and the at least one piece of second segmentation location information.

Optionally, the server performs a first operation on the at least one piece of first segmentation location information and the at least one piece of second segmentation location information to obtain at least one operation result, determines, from the at least one operation result, at least one target operation result less than the first preset value, determines, as target segmentation location information, first segmentation location information corresponding to each target operation result in the at least one target operation result, and determines, as reference segmentation location information, second segmentation location information corresponding to each target operation result in the at least one target operation result.

For details, reference may be made to step 103. The details are not described herein.

It should be noted that the first operation may be taking an absolute value after subtraction, or may be another operation that may reflect that the first segmentation location information is relatively close to the second segmentation location information. For example, after each piece of segmentation location information in the at least one piece of first segmentation location information is separately divided by each piece of second segmentation location information in the at least one piece of second segmentation location information, comparison is performed between a quotient and 1. The present invention sets no limitation thereto.

It should be noted that, when a result of comparing the first preset value with a difference between the at least one piece of target segmentation location information determined by the server from the at least one piece of first segmentation location information according to the at least one piece of first segmentation location information and the reference segmentation location information that corresponds to each piece of target segmentation location information and that is determined from the at least one piece of second segmentation location information according to the at least one piece of second segmentation location information is different, a step executed in the following is also different. If it is determined that a difference between each piece of target segmentation location information and corresponding reference segmentation location information is less than the first preset value, steps 307 to 311 are executed. If it is determined that the difference between each piece of target segmentation location information and corresponding reference segmentation location information is greater than or equal to the first preset value, step 312 is directly executed.

307. If a difference between each piece of target segmentation location information in the at least one piece of target segmentation location information and corresponding reference segmentation location information is less than a first preset value, the server determines at least one piece of third segmentation location information according to the at least one piece of target segmentation location information and the reference segmentation location information corresponding to each piece of target segmentation location information.

Optionally, the server determines, as the at least one piece of third segmentation location information, a result obtained after each piece of target segmentation location information in the at least one piece of target segmentation location information is separately added to the reference segmentation location information corresponding to each piece of target segmentation location information and an average is taken.

For details, reference may be made to step 104. The details are not described herein.

Further, if the at least one piece of first segmentation location information includes the start location and the end location that are captured from the audio content, the at least one piece of third segmentation location information includes a target start location and a target end location that are of the audio content.

308. The server sends a segmentation location recommendation message to the user equipment. The user equipment receives the segmentation location recommendation message sent by the server.

The segmentation location recommendation message carries the audio identifier of the audio content and the at least one piece of third segmentation location information.

Specifically, when receiving a segmentation location request message sent by the user equipment, the server parses the segmentation location request message to obtain the audio identifier of the audio content, searches, according to the audio identifier of the audio content, for stored at least one piece of third segmentation location information matching the audio identifier of the audio content, adds the at least one piece of third segmentation location information obtained by searching and the audio identifier of the audio content into the segmentation location recommendation message, and sends the segmentation location recommendation message to the user equipment. In this case, the user equipment receives the segmentation location recommendation message that carries the audio identifier of the audio content and the at least one piece of third segmentation location information and that is sent by the server.

It should be noted that the at least one piece of third segmentation location information carried in the segmentation location recommendation message may be an individual start location or end location of the audio content, or may be a start location and an end location that correspond to a pairing identifier. The present invention sets no limitation thereto.

Further, the segmentation location recommendation message further carries weight information corresponding to the at least one piece of third segmentation location information, and the weight information is used to indicate a priority of the third segmentation location information.

Specifically, when obtaining at least two pieces of third segmentation location information, the server may set corresponding weight information for each piece of third segmentation location information according to a proximity degree between third segmentation location information and first segmentation location information. That is, the server sets a highest weight indicating a highest priority for third segmentation location information closest to the first segmentation location information. The third segmentation location information closest to the first segmentation location information is used as a segmentation location first selected by the user; the server sets a lowest weight indicating a lowest priority for third segmentation location information farthest from the first segmentation location information. The third segmentation location information farthest from the first segmentation location information is used as a segmentation location last selected by the user. By analogy, details are not described herein.

Weight information of corresponding third segmentation location information may also be determined according to weight information of second segmentation location information participating in a calculation of the third segmentation location information, that is, weight information of reference segmentation location information. That is, the weight information corresponding to the reference segmentation location information is set as the weight information corresponding to the third segmentation location information.

It should be noted that the weight information that corresponds to the at least one piece of third segmentation location information and that is carried in segmentation location recommendation information may be that each piece of third segmentation location information in the at least one piece of third segmentation location information corresponds to one piece of weight information, or may be that several pieces of third segmentation location information are selected from the at least one piece of third segmentation location information according to a rule, and the selected several pieces of third segmentation location information separately correspond to one piece of weight information. The present invention sets no limitation thereto.

In addition, if the at least one piece of third segmentation location information includes a target start location and a target end location that are of the audio content, the segmentation location recommendation message further carries a second pairing identifier matching the target start location and the target end location.

The second pairing identifier is used to indicate a correspondence between the target start location and the target end location that are of the audio content.

Exemplarily, it is assumed that the at least one piece of third segmentation location information includes two target start locations being 1:13 and 1:20 respectively and two target end locations being 2:09 and 2:10 respectively, the target start location 1:13 corresponds to the target end location 2:09, and the target start location 1:20 corresponds to the target end location 2:10. To ensure correct correspondences between the target start locations and the target end locations, pairing identifiers need to be added, that is, second pairing identifiers. For example, a second pairing identifier added to the target start location 1:13 and the target end location 2:09 is 001, and a second pairing identifier added to the target start location 1:20 and the target end location 2:10 is 002.

309. The server determines the at least one piece of third segmentation location information as the at least one piece of second segmentation location information.

Specifically, after determining the at least one piece of third segmentation location information, the server determines and stores the at least one piece of third segmentation location information as the at least one piece of second segmentation location information, that is, updates a stored list of second segmentation location information.

310. The user equipment segments the audio content according to the at least one piece of third segmentation location information.

Two methods in which the user equipment segments the audio content according to the at least one piece of third segmentation location information are as follows:

In a first method, the user equipment obtains a segmentation operation instruction, obtains a segmentation adjustment instruction, and segments the audio content according to the segmentation adjustment instruction and the segmentation operation instruction.

The segmentation operation instruction includes segmentation location information selected from the at least one piece of third segmentation location information, and the segmentation adjustment instruction is used to indicate an offset for adjustment to be performed on the segmentation location information.

Specifically, when receiving the segmentation location recommendation message that carries the audio identifier of the audio content and the at least one piece of third segmentation location information and that is sent by the server, the user equipment parses the segmentation location recommendation message to obtain the audio identifier of the audio content and the at least one piece of third segmentation location information, and when determining that the obtained audio identifier of the audio content is correct, displays the obtained at least one piece of third segmentation location information for the user to select. If the user is unsatisfied with all pieces of third segmentation location information in the at least one piece of third segmentation location information, the user may select one piece of third segmentation location information, select an offset for adjustment to be performed on the third segmentation location information, and add, into the segmentation adjustment instruction, the selected offset for adjustment to be performed on the third segmentation location information and send the segmentation adjustment instruction to the user equipment, so that the user equipment segments the audio content according to the third segmentation location information and the offset that are selected by the user.

Further, the user equipment may further add, into the segmentation location message, segmentation location information obtained after the selected third segmentation location information is adjusted according to the offset and send the segmentation location message to the server, so that the server stores the adjusted segmentation location information and the corresponding audio identifier.

It should be noted that the present invention sets no limitation on a sequence of obtaining the segmentation operation instruction and obtaining the segmentation adjustment instruction by the user equipment. The segmentation operation instruction may be first obtained, and then the segmentation adjustment instruction is obtained. Alternatively, the segmentation adjustment instruction may be first obtained, and then the segmentation operation instruction is obtained.

In a second method, the user equipment obtains a segmentation operation instruction, and segments the audio content according to the segmentation location information.

The segmentation operation instruction includes segmentation location information selected from the at least one piece of third segmentation location information.

Specifically, when receiving the segmentation location recommendation message that carries the audio identifier of the audio content and the at least one piece of third segmentation location information and that is sent by the server, the user equipment parses the segmentation location recommendation message to obtain the audio identifier of the audio content and the at least one piece of third segmentation location information, and displays the obtained at least one piece of third segmentation location information when determining that the obtained audio identifier of the audio content is correct. If there is only a start location in the displayed at least one piece of third segmentation location information, the user selects, from the at least one piece of third segmentation location information according to his or her requirement, a start location with which the user is satisfied, and sends, to the user equipment, a segmentation operation instruction that includes the start location selected from the at least one piece of third segmentation location information. The user equipment obtains the segmentation operation instruction, and segments the audio content according to the start location.

If there is only an end location in the displayed at least one piece of third segmentation location information, the user selects, from the at least one piece of third segmentation location information according to his or her requirement, an end location with which the user is satisfied, and sends, to the user equipment, a segmentation operation instruction that includes the end location selected from the at least one piece of third segmentation location information. The user equipment obtains the segmentation operation instruction, and segments the audio content according to the end location.

If there is pairing of at least one pair of start location and end location in the displayed at least one piece of third segmentation location information, the user selects, from the at least one piece of third segmentation location information according to his or her requirement, a pair of start location and end location with which the user is satisfied, and sends, to the user equipment, a segmentation operation instruction that includes the pair of start location and end location selected from the at least one piece of third segmentation location information. The user equipment obtains the segmentation operation instruction, and segments the audio content according to the pair of start location and end location.

It should be noted that the present invention sets no limitation on a sequence of performing step 309 and step 310. Step 309 may be performed before step 310, or step 310 may be performed before step 309, or step 309 and step 310 may be performed simultaneously.

311. Send, to the server, a recommendation success message carrying the segmentation location information, so that the server updates weight information corresponding to the segmentation location information.

Specifically, the user equipment adds, into the recommendation success message, the segmentation location information used to segment the audio content and sends the recommendation success message to the server, so that the server updates the weight information corresponding to the segmentation location information. In this way, when other user equipment sends a segmentation location message to the server, the server may recommend segmentation location information to the user equipment according to the weight information corresponding to the segmentation location information.

312. The server determines the at least one piece of target segmentation location information as the at least one piece of second segmentation location information if a difference between the at least one piece of target segmentation location information and reference segmentation location information corresponding to each piece of target segmentation location information is greater than or equal to the first preset value.

Specifically, if the difference between the at least one piece of target segmentation location information and the reference segmentation location information corresponding to each piece of target segmentation location information is greater than or equal to the first preset value, the server updates the previously stored at least one piece of second segmentation location information when determining the at least one piece of target segmentation location information as the at least one piece of second segmentation location information.

This embodiment of the present invention provides the audio content segmentation method. User equipment sends a segmentation location message to a server, so that the server determines at least one piece of third segmentation location information according to at least one piece of target segmentation location information and at least one piece of reference segmentation location information and sends a recommended segmentation location to the user equipment, and the user equipment segments audio content according to the at least one piece of third segmentation location information. It can be learned that audio content segmentation is implemented by means of interaction between the user equipment and the server in the present invention. Further, because a difference between target segmentation location information and reference segmentation location information is less than a first preset value, that is, they are relatively close, an error of third segmentation location information obtained by means of an operation according to the target segmentation location information and the reference segmentation location information is small compared with that of first segmentation location information, thereby reducing an error of captured audio content. In addition, if a difference between target segmentation location information and reference segmentation location information is greater than or equal to the first preset value, the server determines a target segmentation location as a second segmentation location, so that a quantity of second segmentation locations stored in the server increases. Therefore, a quantity of second segmentation locations on which a first operation is performed with a first segmentation location also increases, and a quantity of obtained third segmentation locations also increases, thereby providing more options for a user. Moreover, each third segmentation location has corresponding weight information, and the user may select a segmentation location according to a weight value, thereby improving user experience. In addition, the user equipment may further obtain an offset selected by the user for segmentation location information, and segment the audio content according to the offset and the segmentation location information, further improving accuracy of the captured audio content.

Figure 5:
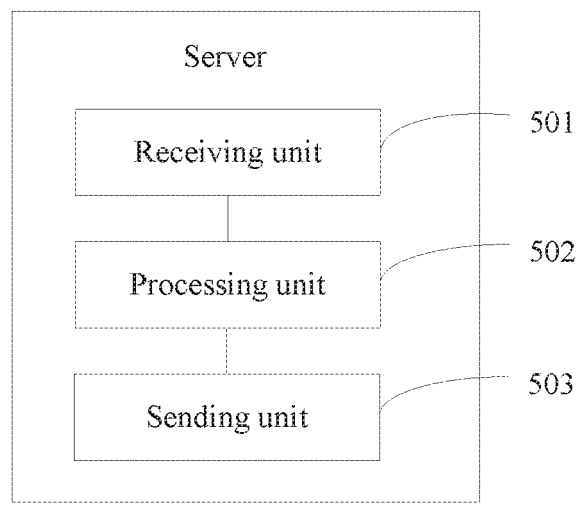
FIG. 5 is a schematic functional diagram of a server according to an embodiment of the present invention.

As shown in FIG. 5, FIG. 5 is a schematic functional diagram of a server according to an embodiment of the present invention. Referring to FIG. 5, the server includes: a receiving unit 501, a processing unit 502, and a sending unit 503.

The receiving unit 501 is configured to receive a segmentation location message sent by user equipment.

The segmentation location message carries at least one piece of first segmentation location information of audio content and an audio identifier of the audio content.

The processing unit 502 is configured to search, according to the audio identifier that is of the audio content and that is received by the receiving unit 501, for stored at least one piece of second segmentation location information matching the audio identifier of the audio content.

The processing unit 502 is further configured to: determine at least one piece of target segmentation location information from the at least one piece of first segmentation location information and determine at least one piece of reference segmentation location information from the at least one piece of second segmentation location information according to the at least one piece of first segmentation location information received by the receiving unit 501 and the at least one piece of second segmentation location information.

The processing unit 502 is specifically configured to: perform a first operation on the at least one piece of first segmentation location information received by the receiving unit 501 and the at least one piece of second segmentation location information to obtain at least one operation result, determine, from the at least one operation result, at least one target operation result less than the first preset value, determine, as target segmentation location information, first segmentation location information corresponding to each target operation result in the at least one target operation result, and determine, as reference segmentation location information, second segmentation location information corresponding to each target operation result in the at least one target operation result.

The processing unit 502 is further configured to: if a difference between each piece of target segmentation location information in the at least one piece of target segmentation location information and corresponding reference segmentation location information is less than the first preset value, determine at least one piece of third segmentation location information according to the at least one piece of target segmentation location information and the reference segmentation location information corresponding to each piece of target segmentation location information.

The processing unit 502 is specifically configured to determine, as the at least one piece of third segmentation location information, a result obtained after each piece of target segmentation location information in the at least one piece of target segmentation location information is separately added to the reference segmentation location information corresponding to each piece of target segmentation location information and an average is taken.

The sending unit 503 is configured to send a segmentation location recommendation message to the user equipment.

The segmentation location recommendation message carries the audio identifier of the audio content and the at least one piece of third segmentation location information determined by the processing unit 502.

Further, the processing unit 502 is further configured to determine the at least one piece of target segmentation location information as the at least one piece of second segmentation location information when the difference between each piece of target segmentation location information in the at least one piece of target segmentation location information and corresponding reference segmentation location information is greater than or equal to the first preset value.

Further, the segmentation location recommendation message further carries weight information corresponding to the at least one piece of third segmentation location information, and the weight information is used to indicate a priority of the third segmentation location information.

The at least one piece of first segmentation location information includes a start location and an end location that are captured from the audio content, and the segmentation location message further carries a first pairing identifier matching the start location and the end location.

The at least one piece of third segmentation location information includes a target start location and a target end location that are of the audio content, and the segmentation location recommendation message further carries a second pairing identifier matching the target start location and the target end location.

Further, the processing unit 502 is further configured to determine the at least one piece of third segmentation location information as the at least one piece of second segmentation location information.

This embodiment of the present invention provides the server. The server determines at least one piece of third segmentation location information according to at least one piece of target segmentation location information and at least one piece of reference segmentation location information, and sends a recommended segmentation location to user equipment, so that the user equipment segments audio content according to the at least one piece of third segmentation location information. It can be learned that audio content segmentation is implemented by means of interaction between the user equipment and the server in the present invention. Further, because a difference between target segmentation location information and reference segmentation location information is less than a first preset value, that is, they are relatively close, an error of third segmentation location information obtained by means of an operation according to the target segmentation location information and the reference segmentation location information is small compared with that of first segmentation location information, thereby reducing an error of captured audio content.

Figure 6:
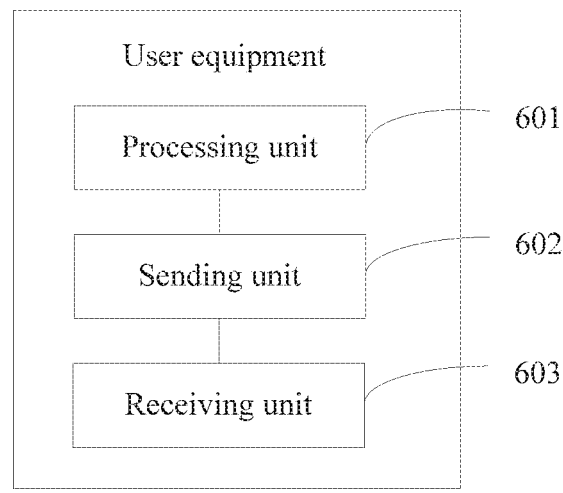
FIG. 6 is a schematic functional diagram of user equipment according to an embodiment of the present invention.

As shown in FIG. 6, FIG. 6 is a schematic functional diagram of user equipment according to an embodiment of the present invention. Referring to FIG. 6, the user equipment includes: a processing unit 601, a sending unit 602, and a receiving unit 603.

The processing unit 601 is configured to obtain at least one piece of first segmentation location information of audio content.

The sending unit 602 is configured to send a segmentation location message to a server.

The segmentation location message carries the at least one piece of first segmentation location information of the audio content and an audio identifier of the audio content.

The receiving unit 603 is configured to receive a segmentation location recommendation message sent by the server.

The segmentation location recommendation message carries the audio identifier of the audio content and the at least one piece of third segmentation location information.

The processing unit 601 is further configured to segment the audio content according to the at least one piece of third segmentation location information received by the receiving unit 603.

Specifically, two methods in which the processing unit 601 segments the audio content according to the at least one piece of third segmentation location information received by the receiving unit 603 are as follows:

In a first method, the processing unit 601 is specifically configured to: obtain a segmentation operation instruction, obtain a segmentation adjustment instruction, and segment the audio content according to the segmentation adjustment instruction and the segmentation operation instruction.

The segmentation operation instruction includes segmentation location information selected from the at least one piece of third segmentation location information, and the segmentation adjustment instruction is used to indicate an offset for adjustment to be performed on the segmentation location information.

In a second method, the processing unit 601 is specifically configured to: obtain a segmentation operation instruction, and segment the audio content according to the segmentation location information.

The segmentation operation instruction includes segmentation location information selected from the at least one piece of third segmentation location information.

Further, the segmentation location recommendation message further carries weight information corresponding to the at least one piece of third segmentation location information, and the weight information is used to indicate a priority of the third segmentation location information.

The at least one piece of first segmentation location information includes a start location and an end location that are captured from the audio content, and the segmentation location message further carries a first pairing identifier matching the start location and the end location.

The at least one piece of third segmentation location information includes a target start location and a target end location that are of the audio content, and the segmentation location recommendation message further carries a second pairing identifier matching the target start location and the target end location.

The sending unit 602 is further configured to send, to the server, a recommendation success message carrying the segmentation location information, so that the server updates the weight information corresponding to the segmentation location information.

This embodiment of the present invention provides the user equipment. The user equipment sends a segmentation location message to a server, so that the server determines at least one piece of third segmentation location information according to at least one piece of target segmentation location information and at least one piece of reference segmentation location information and sends a recommended segmentation location to the user equipment, and the user equipment segments audio content according to the at least one piece of third segmentation location information. It can be learned that audio content segmentation is implemented by means of interaction between the user equipment and the server in the present invention. Further, because a difference between target segmentation location information and reference segmentation location information is less than a first preset value, that is, they are relatively close, an error of third segmentation location information obtained by means of an operation according to the target segmentation location information and the reference segmentation location information is small compared with that of first segmentation location information, thereby reducing an error of captured audio content.

Figure 7:
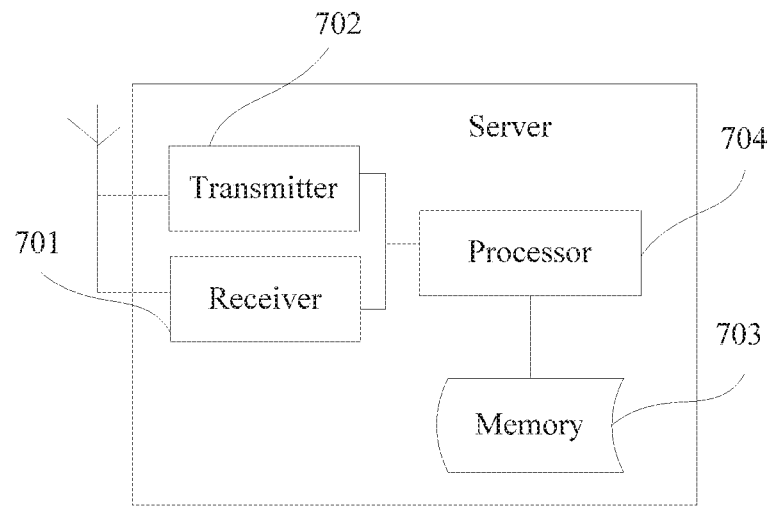
FIG. 7 is a schematic structural diagram of a server according to an embodiment of the present invention.

As shown in FIG. 7, FIG. 7 is a schematic structural diagram of a server according to an embodiment of the present invention. Referring to FIG. 7, the server includes: a receiver 701, a transmitter 702, a memory 703, and a processor 704 connected to the receiver 701, the transmitter 702, and the memory 703.

The memory 703 stores a set of program code, and the processor 704 is configured to invoke the program code stored in the memory 703. The receiver 701, the transmitter 702, and the processor 704 are configured to execute the following operations:

The receiver 701 is configured to receive a segmentation location message sent by user equipment.

The segmentation location message carries at least one piece of first segmentation location information of audio content and an audio identifier of the audio content.

The processor 704 is configured to search, according to the audio identifier that is of the audio content and that is received by the receiver 701, for stored at least one piece of second segmentation location information matching the audio identifier of the audio content.

The processor 704 further determines at least one piece of target segmentation location information from the at least one piece of first segmentation location information and determines at least one piece of reference segmentation location information from the at least one piece of second segmentation location information according to the at least one piece of first segmentation location information received by the receiver 701 and the at least one piece of second segmentation location information.

The processor 704 is specifically configured to: perform a first operation on the at least one piece of first segmentation location information received by the receiver 701 and the at least one piece of second segmentation location information to obtain at least one operation result, determine, from the at least one operation result, at least one target operation result less than the first preset value, determine, as target segmentation location information, first segmentation location information corresponding to each target operation result in the at least one target operation result, and determine, as reference segmentation location information, second segmentation location information corresponding to each target operation result in the at least one target operation result.

The processor 704 is further configured to: if a difference between each piece of target segmentation location information in the at least one piece of target segmentation location information and corresponding reference segmentation location information is less than the first preset value, determine at least one piece of third segmentation location information according to the at least one piece of target segmentation location information and the reference segmentation location information corresponding to each piece of target segmentation location information.

The processor 704 is specifically configured to determine, as the at least one piece of third segmentation location information, a result obtained after each piece of target segmentation location information in the at least one piece of target segmentation location information is separately added to the reference segmentation location information corresponding to each piece of target segmentation location information and an average is taken.

The transmitter 702 is configured to send a segmentation location recommendation message to the user equipment.

The segmentation location recommendation message carries the audio identifier of the audio content and the at least one piece of third segmentation location information determined by the processor.

Further, the processor 704 is further configured to determine the at least one piece of target segmentation location information as the at least one piece of second segmentation location information when the difference between each piece of target segmentation location information in the at least one piece of target segmentation location information and corresponding reference segmentation location information is greater than or equal to the first preset value.

Further, the segmentation location recommendation message further carries weight information corresponding to the at least one piece of third segmentation location information, and the weight information is used to indicate a priority of the third segmentation location information.

The at least one piece of first segmentation location information includes a start location and an end location that are captured from the audio content, and the segmentation location message further carries a first pairing identifier matching the start location and the end location.

The at least one piece of third segmentation location information includes a target start location and a target end location that are of the audio content, and the segmentation location recommendation message further carries a second pairing identifier matching the target start location and the target end location.

Further, the processor 704 is further configured to determine the at least one piece of third segmentation location information as the at least one piece of second segmentation location information.

This embodiment of the present invention provides the server. The server determines at least one piece of third segmentation location information according to at least one piece of target segmentation location information and at least one piece of reference segmentation location information, and sends a recommended segmentation location to user equipment, so that the user equipment segments audio content according to the at least one piece of third segmentation location information. It can be learned that audio content segmentation is implemented by means of interaction between the user equipment and the server in the present invention. Further, because a difference between target segmentation location information and reference segmentation location information is less than a first preset value, that is, they are relatively close, an error of third segmentation location information obtained by means of an operation according to the target segmentation location information and the reference segmentation location information is small compared with that of first segmentation location information, thereby reducing an error of captured audio content.

Figure 8:
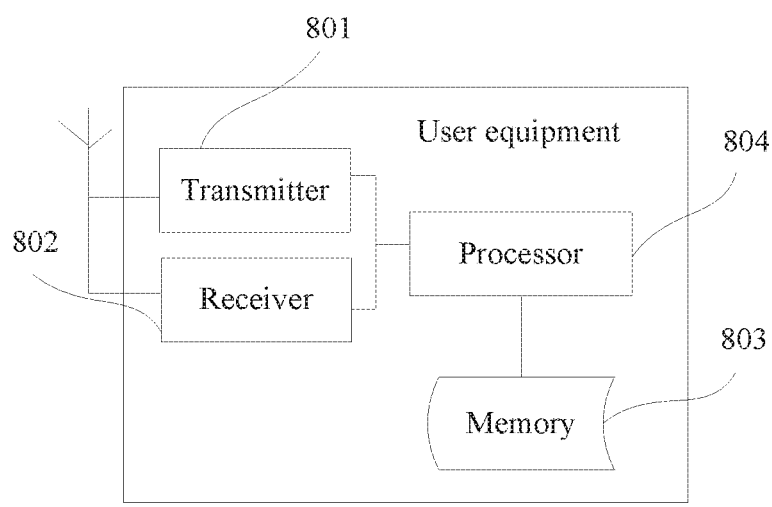
FIG. 8 is a schematic structural diagram of user equipment according to an embodiment of the present invention.

As shown in FIG. 8, FIG. 8 is a schematic structural diagram of user equipment according to an embodiment of the present invention. Referring to FIG. 8, the user equipment includes: a transmitter 801, a receiver 802, a memory 803, and a processor 804 connected to the transmitter 801, the receiver 802, and the memory 803.

The memory 803 stores a set of program code, and the processor 804 is configured to invoke the program code stored in the memory 803. The transmitter 801, the receiver 802, and the processor 804 are configured to execute the following operations:

The processor 804 is configured to obtain at least one piece of first segmentation location information of audio content.

The transmitter 801 is configured to send a segmentation location message to a server.

The segmentation location message carries the at least one piece of first segmentation location information of the audio content and an audio identifier of the audio content.

The receiver 802 is configured to receive a segmentation location recommendation message sent by the server.

The segmentation location recommendation message carries the audio identifier of the audio content and the at least one piece of third segmentation location information.

The processor 804 is further configured to segment the audio content according to the at least one piece of third segmentation location information received by the receiver 802.

Specifically, two methods in which the processor 804 segments the audio content according to the at least one piece of third segmentation location information received by the receiver 802 are as follows:

In a first method, the processor 804 is specifically configured to: obtain a segmentation operation instruction, obtain a segmentation adjustment instruction, and segment the audio content according to the segmentation adjustment instruction and the segmentation operation instruction.

The segmentation operation instruction includes segmentation location information selected from the at least one piece of third segmentation location information, and the segmentation adjustment instruction is used to indicate an offset for adjustment to be performed on the segmentation location information.

In a second method, the processor 804 is specifically configured to: obtain a segmentation operation instruction, and segment the audio content according to the segmentation location information.

The segmentation operation instruction includes segmentation location information selected from the at least one piece of third segmentation location information.

Further, the segmentation location recommendation message further carries weight information corresponding to the at least one piece of third segmentation location information, and the weight information is used to indicate a priority of the third segmentation location information.

The at least one piece of first segmentation location information includes a start location and an end location that are captured from the audio content, and the segmentation location message further carries a first pairing identifier matching the start location and the end location.

The at least one piece of third segmentation location information includes a target start location and a target end location that are of the audio content, and the segmentation location recommendation message further carries a second pairing identifier matching the target start location and the target end location.

The transmitter 801 is further configured to send, to the server, a recommendation success message carrying the segmentation location information, so that the server updates the weight information corresponding to the segmentation location information.

This embodiment of the present invention provides the user equipment. The user equipment sends a segmentation location message to a server, so that the server determines at least one piece of third segmentation location information according to at least one piece of target segmentation location information and at least one piece of reference segmentation location information and sends a recommended segmentation location to the user equipment, and the user equipment segments audio content according to the at least one piece of third segmentation location information. It can be learned that audio content segmentation is implemented by means of interaction between the user equipment and the server in the present invention. Further, because a difference between target segmentation location information and reference segmentation location information is less than a first preset value, that is, they are relatively close, an error of third segmentation location information obtained by means of an operation according to the target segmentation location information and the reference segmentation location information is small compared with that of first segmentation location information, thereby reducing an error of captured audio content.

Figure 9:
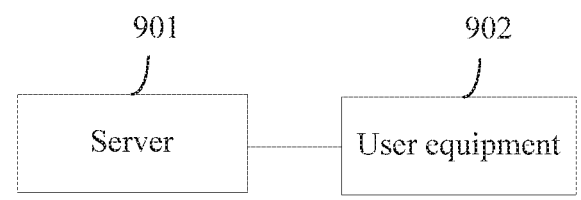
FIG. 9 is a schematic structural diagram of an audio content segmentation system according to an embodiment of the present invention.

An embodiment of the present invention provides an audio content segmentation system. As shown in FIG. 9, the system includes a server 901 and user equipment 902.

The server 901 is the server described in the foregoing embodiment.

The user equipment 902 is the user equipment described in the foregoing embodiment.

This embodiment of the present invention provides the audio content segmentation system. User equipment sends a segmentation location message to a server, so that the server determines at least one piece of third segmentation location information according to at least one piece of target segmentation location information and at least one piece of reference segmentation location information and sends a recommended segmentation location to the user equipment, and the user equipment segments audio content according to the at least one piece of third segmentation location information. It can be learned that audio content segmentation is implemented by means of interaction between the user equipment and the server in the present invention. Further, because a difference between target segmentation location information and reference segmentation location information is less than a first preset value, that is, they are relatively close, an error of third segmentation location information obtained by means of an operation according to the target segmentation location information and the reference segmentation location information is small compared with that of first segmentation location information, thereby reducing an error of captured audio content.

An embodiment of the present invention provides a computer readable storage medium storing one or more programs. The one or more programs include an instruction, and when executed by a server including multiple application programs, the instruction causes the server to execute the method described in FIG. 1.

An embodiment of the present invention provides a computer readable storage medium storing one or more programs. The one or more programs include an instruction, and when executed by user equipment including multiple application programs, the instruction causes the user equipment to execute the method described in FIG. 2.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method implemented by a server for segmenting audio content, the method comprising:
   receiving, by the server, a segmentation location message from a user equipment (UE), wherein the segmentation location message includes at least one piece of first segmentation location information of audio content and an audio identifier of the audio content, wherein the at least one piece of first segmentation location information indicates a selected time piece of the audio content;
   identifying, by the server and based on the audio identifier of the audio content, at least one piece of second segmentation location information having an audio identifier that matches the audio identifier of the audio content;
   determining, by the server, at least one piece of target segmentation location information based on the at least one piece of first segmentation location information;
   determining, by the server, at least one piece of reference segmentation location information based on the at least one piece of first segmentation location information and the at least one piece of second segmentation location information;
   if a difference between a quantity of each piece of target segmentation location information of the at least one piece of target segmentation location information and a quantity of corresponding reference segmentation location information is less than a first preset value, determining, by the server, at least one piece of third segmentation location information based on the at least one piece of target segmentation location information and the reference segmentation location information corresponding to each piece of target segmentation location information; and
   sending, by the server, a segmentation location recommendation message to the UE, wherein the segmentation location recommendation message includes the audio identifier of the audio content and the at least one piece of third segmentation location information, wherein:
      the segmentation location recommendation message further includes weight information corresponding to the at least one piece of third segmentation location information,
      the weight information is used to indicate a priority of the at least one piece of third segmentation location information, and
      the priority of the at least one piece of third segmentation location information indicates a closeness of the at least one piece of third segmentation location information to the at least one piece of first segmentation location information.

2. The method according to claim 1, wherein determining, by the server, the at least one piece of target segmentation location information and determining, by the server, the at least one piece of reference segmentation location information comprises:
   performing, by the server, a first operation on the at least one piece of first segmentation location information and the at least one piece of second segmentation location information to obtain at least one operation result;
   determining, by the server and from the at least one operation result, a quantity of at least one target operation result that is less than the first preset value;

determining, by the server, that first segmentation location information corresponding to each target operation result of the at least one target operation result is target segmentation location information; and determining, by the server, that second segmentation location information corresponding to each target operation result of the at least one target operation result is reference segmentation location information.

3. The method according to claim 1, further comprising:
determining, by the server, that the at least one piece of target segmentation location information is the at least one piece of second segmentation location information if the difference between the quantity of each piece of target segmentation location information of the at least one piece of target segmentation location information and the quantity of corresponding reference segmentation location information is greater than or equal to the first preset value.

4. The method according to claim 1, wherein:
the at least one piece of first segmentation location information comprises a start location and an end location that are captured from the audio content;
the segmentation location message further includes a first pairing identifier matching the start location and the end location;
the at least one piece of third segmentation location information comprises a target start location and a target end location that are of the audio content; and
the segmentation location recommendation message further includes a second pairing identifier matching the target start location and the target end location.

5. The method according to claim 1, wherein determining the at least one piece of third segmentation location information based on the at least one piece of target segmentation location information and the reference segmentation location information corresponding to each piece of target segmentation location information comprises:
determining, by the server, that a result, based on an average of the quantity of each piece of target segmentation location information of the at least one piece of target segmentation location information and an average of the quantity of reference segmentation location information corresponding to each piece of target segmentation location information, is the least one piece of third segmentation location information.

6. The method according to claim 1, further comprising:
determining, by the server, that the at least one piece of third segmentation location information is the at least one piece of second segmentation location information after the server sends the segmentation location recommendation message to the UE.

7. A method implemented by a user equipment (UE) for segmenting audio content, the method comprising:
obtaining, by the UE, at least one piece of first segmentation location information of audio content, wherein the at least one piece of first segmentation location information indicates a selected time piece of the audio content;
receiving, by the UE, a first operation;
in response to the first operation, sending, by the UE, a segmentation location message to a server, wherein the segmentation location message includes the at least one piece of first segmentation location information of the audio content and an audio identifier of the audio content;
receiving, by the UE, a segmentation location recommendation message from the server, wherein the segmentation location recommendation message includes the audio identifier of the audio content and at least one piece of third segmentation location information that is according to the first segmentation location information of the audio content and an audio identifier of the audio content;
displaying, by the UE, the at least one piece of third segmentation location information;
receiving, by the UE, a second operation to the at least one piece third segmentation location information; and
in response to the second operation, segmenting, by the UE, the audio content based on the at least one piece of third segmentation location information.

8. The method according to claim 7, wherein:
the segmentation location recommendation message further includes weight information corresponding to the at least one piece of third segmentation location information; and
the weight information is used to indicate a priority of the third segmentation location information.

9. The method according to claim 7, further comprising:
after the audio content is segmented based on the at least one piece of third segmentation location information, sending, by the UE and to the server, a recommendation success message including the segmentation location information for use by the server to update weight information corresponding to the segmentation location information.

10. The method according to claim 7, wherein:
the at least one piece of first segmentation location information comprises a start location and an end location that are captured from the audio content;
the segmentation location message further includes a first pairing identifier matching the start location and the end location;
the at least one piece of third segmentation location information comprises a target start location and a target end location that are of the audio content; and
the segmentation location recommendation message further includes a second pairing identifier matching the target start location and the target end location.

11. The method according to claim 7, wherein segmenting, by the UE, the audio content comprises:
obtaining, by the UE, a segmentation operation instruction, wherein the segmentation operation instruction comprises segmentation location information selected from the at least one piece of third segmentation location information;
obtaining, by the UE, a segmentation adjustment instruction, wherein the segmentation adjustment instruction is used to indicate an offset for adjustment to be performed on the segmentation location information; and
segmenting, by the UE, the audio content based on the segmentation adjustment instruction and the segmentation operation instruction.

12. The method according to claim 7, wherein segmenting, by the UE, the audio content comprises:
obtaining, by the UE, a segmentation operation instruction, wherein the segmentation operation instruction comprises segmentation location information selected from the at least one piece of third segmentation location information; and
segmenting, by the UE, the audio content based on the segmentation location information.

13. A user equipment comprising:
a memory;
a transmitter;
a receiver; and
one or more processors configured to:
- obtain at least one piece of first segmentation location information of audio content, wherein the at least one piece of first segmentation location information indicates a selected time piece of the audio content,
- receive a first operation,
- in response to the first operation, send, using the transmitter, a segmentation location message to a server, wherein the segmentation location message includes the at least one piece of first segmentation location information of the audio content and an audio identifier of the audio content,
- receive, using the receiver, a segmentation location recommendation message from the server, wherein the segmentation location recommendation message includes the audio identifier of the audio content and at least one piece of third segmentation location information that is according to the first segmentation location information of the audio content and an audio identifier of the audio content,
- display the at least one piece of third segmentation location information,
- receive a second operation to the at least one piece of third segmentation location information, and
- in response to the second operation, segment the audio content based on the at least one piece of third segmentation location information.

14. The user equipment according to claim 13, wherein:
the segmentation location recommendation message further includes weight information corresponding to the at least one piece of third segmentation location information; and
the weight information is used to indicate a priority of the third segmentation location information.

15. The user equipment according to claim 13, wherein the one or more processors are further configured to:
send, using the transmitter and to the server, a recommendation success message including the segmentation location information for use by the server to update weight information corresponding to the segmentation location information.

16. The user equipment according to claim 13, wherein:
the at least one piece of first segmentation location information comprises a start location and an end location that are captured from the audio content;
the segmentation location message further includes a first pairing identifier matching the start location and the end location;
the at least one piece of third segmentation location information comprises a target start location and a target end location that are of the audio content; and
the segmentation location recommendation message further includes a second pairing identifier matching the target start location and the target end location.

17. The user equipment according to claim 13, wherein the one or more processors are further configured to:
- obtain a segmentation operation instruction, wherein the segmentation operation instruction comprises segmentation location information selected from the at least one piece of third segmentation location information;
- obtain a segmentation adjustment instruction, wherein the segmentation adjustment instruction indicates an offset for adjustment of the segmentation location information; and
- segment the audio content based on the segmentation adjustment instruction and the segmentation operation instruction.

18. The user equipment according to claim 13, wherein the one or more processors are further configured to:
- obtain a segmentation operation instruction, wherein the segmentation operation instruction comprises segmentation location information selected from the at least one piece of third segmentation location information; and
- segment the audio content based on the segmentation location information.

19. A user equipment (UE) comprising:
a memory;
a receiver;
a transmitter; and
at least one processor configured to:
- obtain at least one piece of first segmentation location information of audio content, wherein the at least one piece of first segmentation location information indicates a first selected time piece of the audio content,
- send, using the transmitter, a segmentation location message to a server for enabling the server to determine at least one piece of target segmentation location information from the at least one piece of first segmentation location, wherein the segmentation location message includes the at least one piece of first segmentation location information of the audio content, and an audio identifier of the audio content,
- when a difference between a quantity of each piece of target segmentation location information of the at least one piece of target segmentation location information and a quantity of corresponding reference segmentation location information is less than a preset threshold, receive, using the receiver, the audio identifier of the audio content and at least one piece of third segmentation location information that is according to the at least one piece of first segmentation location information of the audio content,
- segment the audio content based on the at least one piece of third segmentation location information.

* * * * *